Feb. 28, 1928.
J. B. HICKAM
CORN PLANTER
Filed Aug. 29, 1925
1,661,120
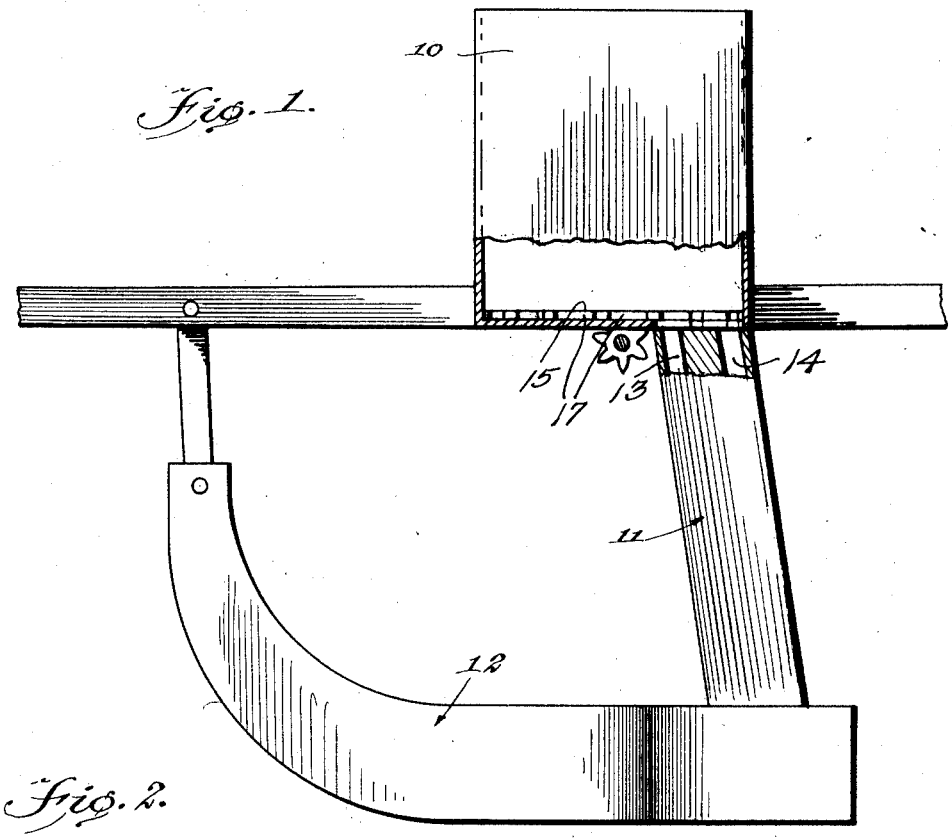
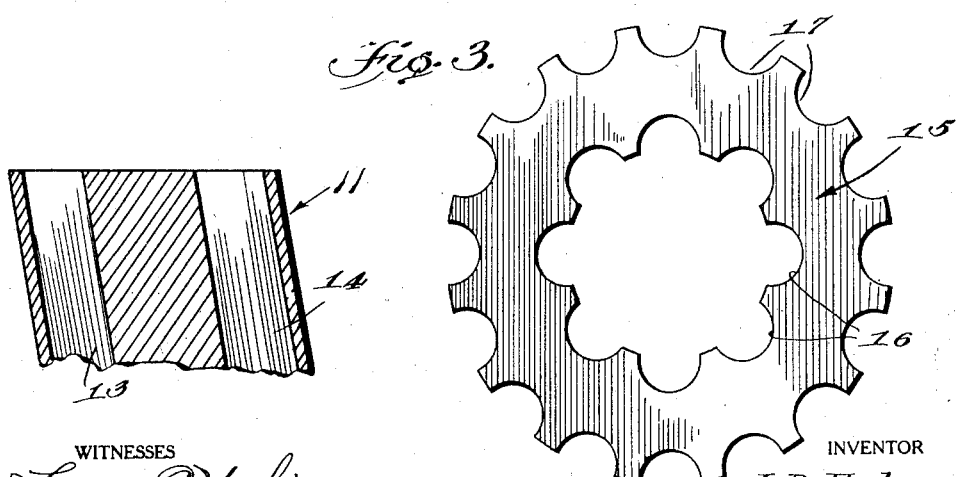
WITNESSES
INVENTOR
J. B. Hickam,
BY
ATTORNEYS Patented Feb. 28, 1928.

1,661,120

UNITED STATES PATENT OFFICE.

JOHN BURNHAM HICKAM, OF COLUMBIA, MISSOURI.

CORN PLANTER.

Application filed August 29, 1925. Serial No. 53,379.

This invention relates to corn planters.

The invention more particularly relates to a novel method and means for planting corn in check rows.

In planting corn usually three or more grains are planted to comprise a "hill" of corn, and after the corn has grown a certain height each hill is "thinned" to usually two stalks. The "thinning" requires considerable labor.

The purpose of the present invention is to provide a method and means for planting corn in check rows in such a manner that the "thinning" of the corn may be accomplished during the first plowing thereof.

In carrying out my invention I provide a corn dispensing or dropper arrangement for corn planters whereby each "hill" will comprise three grains of corn, two of which are dropped together and the third removed therefrom. By planting the "hills" of corn in this way, at the time of first plowing the corn in a direction transverse to the direction the planter proceeds in planting said corn, the plow can be guided to up-root the single stalk of each "hill" in case all three grains have germinated and grown.

In case one grain of the two planted together fails to germinate, the plow can be guided to miss the single stalk from the seed planted at a distance from the other two seeds, so as to leave the proper number of two stalks in the hill.

As a means for planting the seed corn in the arrangement I have described, I provide a boot having two seed delivery passages, said passages being arranged one forward to the other. I also provide a seed plate which can be employed with the usual seed planting mechanism of a planter, and which will operate to drop one grain of seed in the front passage of the seed boot and two seeds in the rear passage thereof for each "hill" planted.

I have illustrated my novel form of seed plate and how the same may be applied in the accompanying drawings, in which:

Figure 1 is a side view partly in section of a portion of a corn planter with the improvement applied.

Figure 2 is a fragmentary vertical sectional view of the seed boot on an enlarged scale, and Figure 3 is a perspective view of my form of seed plate on an enlarged scale.

Referring to the drawings more particularly 10 indicates a seed hopper, 11 a seed boot, and 12 a shoe. The hopper 10, boot 11, and shoe 12 may be arranged in the usual manner. As will be noted in Figure 2 the boot 11 is provided with two seed delivery passages 13 and 14. It will be observed the passage 13 is forward to the passage 14. The passage 14 should be of greater width than passage 13 as will later become apparent.

In Figure 3 I have shown a seed plate of my invention, which is in the form of an annular plate 15 with its inner periphery formed with a plurality of semi-circular notches 16. These notches are preferably eight in number. The outer periphery of the plate 15 is provided with similarly shaped notches 17. Notches 17 are sixteen in number or in other words two notches occur on the outer periphery of the plate for each notch on the inner periphery of said plate.

The manner in which the plate 15 may be arranged in the hopper 10 and operated by the usual checking mechanism of a planter is thought to be entirely clear to those skilled in the art. The plate will operate to bring two of its notches 17 into registration with the passage 14 of shoe 11 for each notch 16 brought into registration with passage 13 of said shoe. Each of the notches 16 and 17 will accommodate a grain of corn, consequently two grains of corn would be dropped into the passage 14 simultaneously with the dropping of one grain in passage 13. The passages 13 and 14 are preferably arranged six inches apart, and consequently it is obvious that each "hill" planted with a planter using my form of seed plate would comprise two grains of seed close together and one grain spaced six inches therefrom. The single grain would be planted six inches forward to the two grains, that is with relation to the movement of the corn planter. If each hill of corn were planted in the manner described, it is apparent that in plowing the corn in a direction transverse to the movement of the corn planter when planting said corn, the single stock spaced six inches from the other two stocks of each "hill" of corn could easily be up-rooted with the plow if desired. The corn could be thinned at the first plowing thereof and with little difficulty.

While I have shown and described my invention when employed with a corn planter it is to be understood I am not to be so limited, as it is apparent the same could be adapted to planting other seeds if desired.

I claim:

In a corn planter, a hopper, a seed boot below the hopper and having two delivery passages of unequal size and spaced from one another and a ring-like seed plate mounted in the hopper and having in its inner and outer periphery semi-circular notches each adapted to receive a grain of corn, the number of notches in the outer periphery of the plate being double of the number in the inner periphery, whereby two grains of corn will be delivered into the larger delivery passage of the boot and one into the smaller passage simultaneously, so that three grains of corn will be planted in a hill, with two of the grains close together and one spaced therefrom, as and for the purpose set forth.

JOHN BURNHAM HICKAM.